United States Patent [19]

Clark

[11] 4,378,871

[45] Apr. 5, 1983

[54] METHOD OF PRODUCING SMOOTH-UNIFORM STREAMS OF SEMI-POURABLE FIBROUS PARTICLES

[76] Inventor: James d'A. Clark, Chuckanut Point, Bellingham, Wash. 98225

[21] Appl. No.: 32,700

[22] Filed: Apr. 23, 1979

Related U.S. Application Data

[63] Continuation of Ser. No. 839,195, Feb. 6, 1978, abandoned.

[51] Int. Cl.[3] .......... B65G 11/16

[52] U.S. Cl. .......... 193/2 R; 222/196

[58] Field of Search .......... 193/1, 2 R, 2 B; 198/658, 771, 803; 19/105, 296; 34/63, 108, 135; 144/320 R; 222/161, 167, 196, 199, 200, 414; 241/284; 264/115, 118, 138, 140, 165; 366/228, 229, 230, 231, 240

[56] References Cited

U.S. PATENT DOCUMENTS

| | | | |
|---|---|---|---|
| 187,187 | 2/1877 | Smith et al. | 366/228 |
| 215,562 | 5/1879 | Blythe et al. | 366/228 |
| 430,906 | 6/1890 | Whitney | 366/230 |
| 2,077,726 | 4/1937 | Uong | 222/199 X |
| 2,192,912 | 3/1940 | Howie | 241/284 |
| 2,578,180 | 12/1951 | Edwards | 241/284 |
| 2,764,392 | 9/1956 | Fisher | 366/228 |
| 3,451,565 | 6/1969 | Jung | 198/758 |
| 3,588,052 | 6/1971 | Scholtz | 366/228 |
| 3,881,225 | 5/1975 | Lambert | 264/165 |
| 4,188,130 | 2/1980 | Engels | 366/228 |

*Primary Examiner*—James L. Rowland

*Attorney, Agent, or Firm*—McDougall, Hersh & Scott

[57] ABSTRACT

A method as disclosed for conversion of a stream of particulate fibrous materials that form clusters when poured from a container (semi pourable) by processing the materials through an inclined rotating tubular member having a high degree of surface roughness whereby the clusters are dispersed during travel through the tubular member for issuance as a uniform stream from the outlet thereof. The absence of clusters is particularly desirable when the fibrous materials are intended to be spread into a smooth mat for use in the manufacture of molded board.

7 Claims, 4 Drawing Figures

METHOD OF PRODUCING SMOOTH-UNIFORM STREAMS OF SEMI-POURABLE FIBROUS PARTICLES

This is a continuation of application Ser. No. 839,195, filed Feb. 6, 1978, now abandoned.

This invention relates to the processing of semi-pourable fibrous elements such as wooden wafers to make a continous uniform stream of separated wooden wafers available for uniform distribution in forming a mat.

In the operation of laying down a uniform mat of semi-pourable fibrous materials, such as short lengths of wooden strands or wooden wafers, such as described in U.S. Pat. No. 2,776,687, generally satisfactory separation for doing so is described in U.S. Pat. No. 3,881,225. As described in the aforementioned patent, a constant stream of particles is carried by a conveyor to the apparatus and removed from the end of the conveyor by a rapidly moving spike roll which claws off particles from the end of the oncoming stream, which particles are then fed into the depositing apparatus.

The spike roll is necessary because, if it is not used for semi-pourable particles, especially if they are rough and hairy or damp, the particles will break off from the conveyed stream as they are being discharged to form large clumps or clusters. The spiked roll serves markedly to reduce the size of these clumps, but if the particles are elongated when clawed off, each particle almost invariably brings adjacent particles with it, thus forming a stream of small clumps. In fact, if the stream is not large, it may even become disconnected whereby it becomes difficult if not impossible by known means to spread and distribute such streams of particles into a uniform, smooth mat.

It is an object of this invention to provide a method and means for breaking up such clumps or clusters of fibrous particles whereby the latter issue smoothly as a uniform stream of separated particles capable of being spread onto a continuously moving surface to form a smooth and uniform mat thereon.

Figure 1:
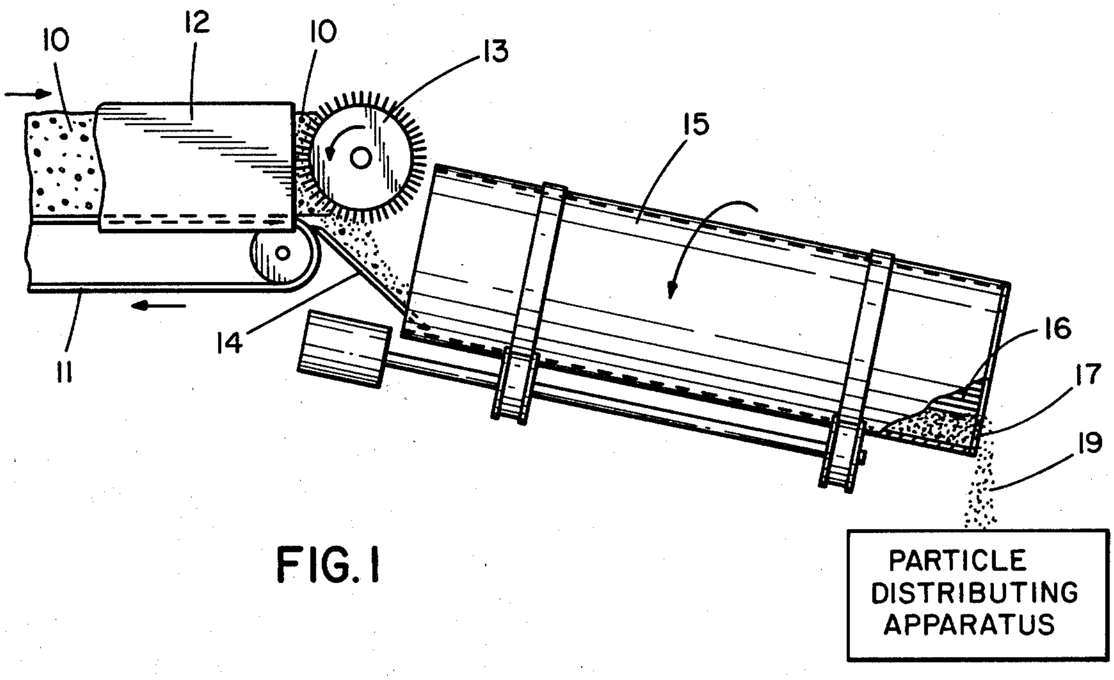
Figure 2:
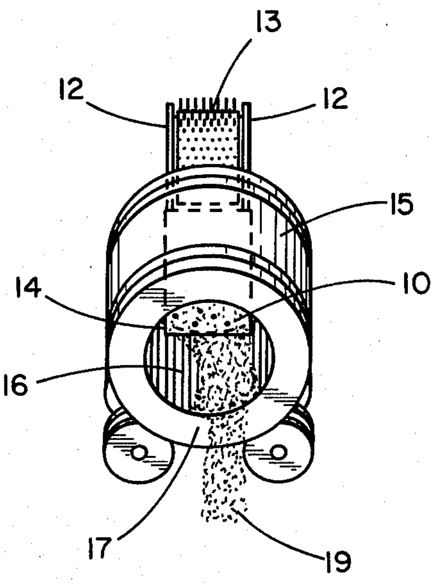
Figure 3:
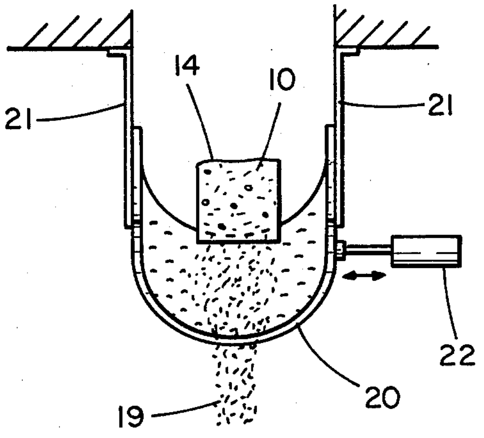
Figure 4:
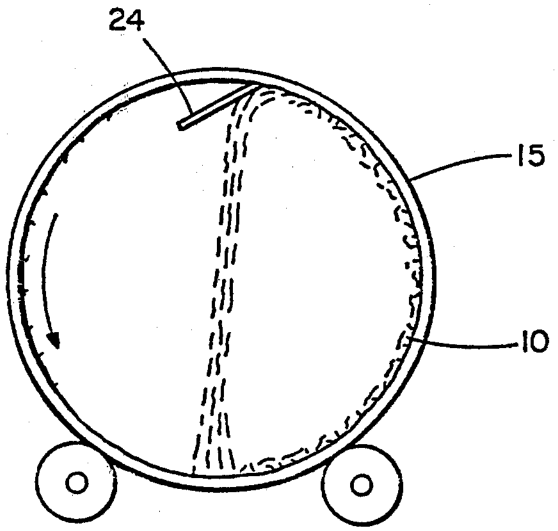

These and other objects and advantages of this invention will hereinafter appear and for purposes of illustration, but not of limitation, embodiments of the invention are shown in the accompanying drawing in which:

FIG. 1 is a plan view in side elevation of an apparatus embodying the features of this invention, FIG. 2 is an end view of the apparatus shown in FIG. 1, FIG. 3 is a modification in cross section of the apparatus of this invention; and FIG. 4 is a further modification in cross-section of the apparatus of this invention.

It has been found that if such a stream containing small clumps of wooden wafers or other fibrous elements is fed into an inclined, open ended, revolving tubular member having a rough internal surface which serves to lift the particles and allows them to fall back down during rotational movement, the clumps will be broken up as the particles progress down the inclined tubular member so that they will be discharged from the exit end of the tubular member as a smooth and steady stream substantially free of clusters. If the particles are slender, as compared to their length, especially if they also have rough surfaces or are curled, they are relatively non-pourable, except in the form of large clusters. However, by passing down a rotating, inclined tubular member of adequate length and diameter, they will issue in a stream as smooth and steady as if they were completely pourable. This assumes that the particles are not so long and so fine that the action provided cannot separate one from another.

Referring now to the drawings, a metered stream of semi-pourable fibrous particles 10 is shown as being transported on the upper run of an endless belt 11 opening in a trough 12, at the end of which there is provided a rapidly revolving spiked roll 13. The spiked roll claws particles and clumps of particles off the conveyor onto a downwardly inclined chute 14 and into the upper open end of an inclined tubular member 15 mounted for rotational movement. The inner surface of the tubular member 15 is roughened, such for example as by a number of longitudinally extending corrugations 16 or projections. Means such as a collar 17 may be provided as a dam at the exit end of the tubular member whereby the number of particles retained in the tubular member is markedly increased before overflow. The disintegration of clumps or clusters for separation is enhanced by reason of the additional work performed during the tumbling action of such higher concentration of fibrous particles.

The stream 19 issuing from the end of the tubular member is particularly well adapted for feeding directly into some form of particle distributing apparatus, such as the felter described in U.S. Pat. No. 3,881,225 to form a smooth, clump-free mat on a continuously moving collecting surface.

Experiments were conducted with a tubular member having a length of 2 meters and an internal diameter of 45 cm. A thin metal sheet was fixed as a lining on the inner surface with circumferentially spaced apart corrugations extending lengthwise along the axis of the tubular members. One hundred grams of wooden wafers each having a dimension of about $65\times25\times0.8$ mm. were packed together in a round heap at the upper inlet end of the tubular member. The tubular member was rotated at various speeds within the range of 25 to 60 rpm and with the tubular member inclined at various angles within the range of 5° to 12° with the horizontal. The most favorable conditions with the described apparatus was a speed of about 40 rpm at an angle of 8°. Under these conditions, the particles began to issue as a smooth stream from the exit end beginning at 7 seconds and terminating at about 13 seconds. The wafers issued at a uniform rate after a steady state was reached through the period of 7 to 13 seconds. At an angle of 12°, the resident time within the tubular member was from 5 to 9 seconds, depending on the speed of rotation.

It will be obvious that the constant addition of clusters of wafers to the upper feed end of the rotating tubular member will enable it to deliver an unexpectedly uniform and smooth flow of particles from the lower exit end.

In FIG. 3 the tubular member 15 is shown as being replaced by an inclined semi-circular trough 20 having surface roughness on its interior. The surface in the trough is suspended from springs 21 and violently oscillated sideways by well known mechanical or electromechanical oscillating means 22 to a degree necessary to cause small clumps of the particles 14 to be separated before they are discharged from the exit end of the trough. By way of modification, the trough may be provided with a roughened interior surface and vibrated lengthwise, or by a combination of lengthwise and sidewise movements, or by an elliptical movement. However, the apparatus shown in FIGS. 1 and 2 is preferred especially because of the simplicity of its construction and operation and its effectiveness.

Because of the difficulty of feeding a uniform stream of fibrous materials into a felter of the type described in U.S. Pat. No. 2,770,844 despite its otherwise obvious advantages, it has not been widely used. The method of this invention provides, for the first time, means for converting a stream of resinous coated elongate fibrous particles for feeding a device of the type described in the aforementioned patents whereby a uniform mat can be obtained on a moving collecting surface and a board can be obtained by compression at elevated temperature having a hitherto unobtainable uniform density throughout the cross section. The latter is very important since, if the body of the board is formed containing aggregates of fibrous particles, the smooth flat surface imparted by the press will subsequently become uneven when the board is exposed to moisture or high humidity or, if such a board is veneered, the denser aggregates and the areas of lesser density will be "telegraphed" to the outer surface of the veneer and ruin its appearance.

The extent to which the bundles or semi-pourable wooden or fibrous particles or wafers are subjected to the tumbling action for separation will depend somewhat on the angle of inclination of the tubular member, its diameter, length, and rate of rotation. The rate of rotation of the tubular member should be less than that which the particles will be held at centrifugal force to the walls of the tubular member. With a diameter of about 30–60 cm the desired results can be achieved with a rate of rotation within the range of 10 to 75 rpm and preferably about 30 to 50 rpm.

The angle of inclination can be varied through a wide range depending on the dimensions of the apparatus, but it is preferred to dispose the tubular member having approximately the dimensions and conditions previously discussed for rotation about an axis inclined at an angle within the range of 5°–15° and preferably 6°–10° with the horizontal. The length of the tubular member will depend somewhat upon the angle of inclination, as indicated in the preceding example. Under the conditions described wherein the tubular member is disposed at a slope of 5°–15°, revolves at a rate of 15–75 rpm and has an internal diameter within the range of 30–60 cm, the desired results can be achieved with a tubular member having a length of from 1–5 m. It is desirable to make use of a length whereby the resident time of the particles for tumbling action within the tubular member will be at least 5 seconds and preferably more than 8–10 seconds, especially if the particles are not easily separated. While the resident time can exceed one minute, little if any additional benefit is achieved.

The desired configuration or surface roughness on the inner wall of the tubular member or trough can be achieved by the use of spaced longitudinal strips of metal. Alternatively, the surface configuration can be in the form of corrugations, dimples, cross hatching or in the form of an abraded surface to which the particles will tend to cling.

It is possible to achieve the objectives by speeding up the tubular member 15 sufficiently to cause the particles 10 to cling to the surface by centrifugal force, then use a long scraper 24 fixed along the top of the member to remove and agitate them so they fall and progress down the tube. The angle of inclination of the member may then be increased beyond 15° if desired.

It will be understood that changes may be made in the details of construction, arrangement and operation without departing from the spirit of the invention, especially as defined in the following claims.

I claim:

1. In the process of feeding semi-pourable fibrous particles in the form of wood wafers, plates or shavings which tend to cling together as clumps or clusters to apparatus that serves to form the particles into a structure, the steps of obtaining a more uniform structure by continuously feeding the particles into the upper portion of a downwardly inclined conveyor, and under the influence of gravitational force and the motion of the conveyor agitating the particles during downward movement through the conveyor to cause clusters of particles to be broken up and spaced longitudinally, thus causing the particles to issue from a lower portion of the conveyor in the form of a smooth, continuous uniform stream, and feeding said smooth, continuous, uniform stream directly to said apparatus.

2. The method as claimed in claim 1, in which the conveyor comprises a rotatable, inclined tubular member having a cross-sectional area many times that of said stream, the internal surface of which is characterized by unevenness capable of raising and longitudinally spreading the particles during rotation of the tubular member.

3. The method as claimed in claim 2, in which the surface unevenness comprises circumferentially spaced apart axially extending corrugations.

4. The method as claimed in claim 2, in which the tubular member has a diameter within the range of 30–60 cm, a length within the range of 1–5 meters, is mounted at a slope within the range of 5°–15° and is rotated at a rate of 15–75 rpm.

5. The method as claimed in claim 1, in which the particles have a resident time of at least 5 seconds during processing through the conveyor.

6. The method as claimed in claim 1 in which the downwardly inclined conveyor comprises a tubular member having a cross-sectional area many times that of the stream, and in which the tubular member is rotated at a speed sufficient to cause the particles to cling to the surface by centrifugal force and which includes the step of scraping the internal surface of the tubular member in the top portion to remove the particles from the surface whereafter the particles fall gravitationally and mix and join the downward oncoming stream of particles.

7. The method as claimed in claim 6 in which the internal surface of the tubular member is characterized by surface roughness.

* * * * *